March 17, 1925.

G. H. E. DE RAM 1,529,878

SHOCK ABSORBER FOR THE SUSPENSION ARRANGEMENTS OF VEHICLES

Filed Nov. 20, 1922

INVENTOR

Patented Mar. 17, 1925.

1,529,878

UNITED STATES PATENT OFFICE.

GEORGES HENRI ERNEST DE RAM, OF BOULOGNE SUR SEINE, FRANCE.

SHOCK ABSORBER FOR THE SUSPENSION ARRANGEMENTS OF VEHICLES.

Application filed November 20, 1922. Serial No. 602,297.

*To all whom it may concern:*

Be it known that I, GEORGES HENRI ERNEST DE RAM, engineer, citizen of the French Republic, residing at Boulogne sur Seine, Department of the Seine, in France, and having P. O. address 22$^{bis}$ Rue de Silly, in the said city, have invented certain new and useful Improvements in Shock Absorbers for the Suspension Arrangements of Vehicles; and I do hereby declare the following to be a full, clear, and exact description of the invention, such as will enable others skilled in the art to which it appertains to make and use the same.

The present invention has reference to shock absorbers or damping devices for the suspension arrangements of vehicles and more especially for those arrangements in which the flexibility of the springs is somewhat slight; that is to say arrangements in which the movements of the springs, when below a certain speed, require to be braked or damped on expansion so as to avoid rebounds. When the vehicle is travelling above the said speed the rise of the axle must, on the contrary, be braked or damped in order to ensure a good adhesion of the wheels to the ground. The shock absorber or damping device according to this invention, whilst realizing these conditions, is of the so-called "liquid type" and is characterized furthermore, by an action which varies with the speed.

In the accompanying drawings there are illustrated general forms of shock absorbers or damping devices according to this invention.

Figure 1:
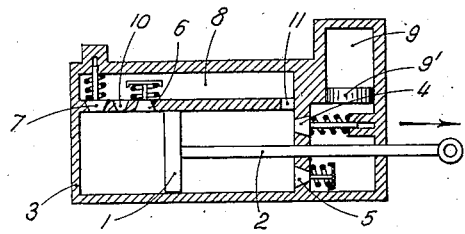
Fig. 1 is a longitudinal section taken through one form of shock absorber embodying my invention.

On referring to Figure 1 it will be seen that the arrangement comprises a piston 1 the rod 2 of which is connected in a suitable manner to the axle. This piston moves in a cylinder 3 including valves 4 and 5 at the right hand end and valves 6 and 7 near the other end of the said cylinder; suitable springs regulate the lifts of these valves. Ports 10 and 11 permit communication by means of a conduit 8 between the two opposite sides of the piston. At 9 there is a cylinder in which moves a free piston 9'; this cylinder forms an air chamber. The method of operation is as follows: The device is so adjusted that a rising movement of the axle causes a displacement of the piston in the direction of the arrow. If the displacement is not very violent the flow of the liquid contained in the shock absorber will take place through the ports 11 and 10 and even through the valve 4 under certain conditions, the output of this valve being limited.

Upon its return the piston will be braked, as the liquid in front of the piston can flow off only through the port 10. This port, which has the form of a nozzle, presents as a matter of fact a greater resistance to the passage of the liquid on the return of the piston, than it does when the piston moves to the right in the direction of the arrow.

When the shocks are more violent and the displacements of the piston more rapid, it will no longer be possible for the liquid to flow off through the channels indicated above, the aperture being too small. The fluid will then lift the braking valve 4 and displace the piston 9', thus compressing the air in the cylinder 9. A vacuum will consequently be formed at the left hand side of the piston so that the latter will be permitted to return rapidly until it again actuates the liquid. If, at this moment, the speed of the axle is not considerable, it will again be braked, the liquid running off through the orifice 10; if, on the contrary, the speed is high then the valve 7 will be lifted and the return of the axle will take place rapidly. For this purpose the valve 7 is so regulated as not to be lifted under the action of the suspension spring alone.

Figure 2:
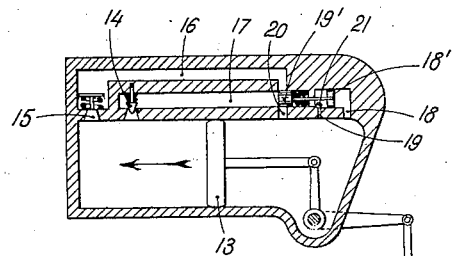
Fig. 2 is a similar view taken through a modified form.

In the shock absorber shown in Figure 2, the operation is slightly different, the air cylinder 9 being done away with, the device in this case is entirely filled with liquid.

The shock absorber shown in this figure comprises a cylinder and a piston 13 fitted thereto and connected to the axle 12 by a suitable transmission gear. Three valves are provided in the cylinders at 14, 15 and 19', and ports 18, 19 and 20 are provided in the front of the cylinder, the object of which will be hereinafter described. The small piston valve 19', closing the port 20, is rigidly secured to a small piston 18', slidably mounted between the ports 18 and 19. Conduits 16 and 17 establish communication between the two sides of the piston 13. The action of this shock absorber is as follows: The displacement of the piston 13 in the direction of the arrow, due to the lift of the axle, causes the flowing off of the liquid through the braking valve 14, the conduit 17 and the port 20 blocked by the piston valve 19'. This piston valve 19' will be pushed forward a greater or lesser distance by the liquid according to the speed at which the liquid flows, thus, to a certain extent, uncovering the port or opening 20. The return will be made through this opening, the conduit 16 and the valve 15. Consequently it is the position of the piston valve 19' which regulates the size of the outlet through the port 20. This piston valve is connected to the small hydraulic brake formed by the piston 18' which can move freely from left to right as the liquid enters direct into its cylinder through the port 19, but upon the return this port is blocked by a flap 21 of suitable type and the piston valve 19' only moves slowly back to its closing position.

The braking of the rising movements of the axle is, therefore, effected by the valve 14 and thus increases together with the speed; the braking of the expansion of the spring, on the contrary, decreases in proportion as the speed increases, the section of the port 20 being progressively increased.

Figure 3:
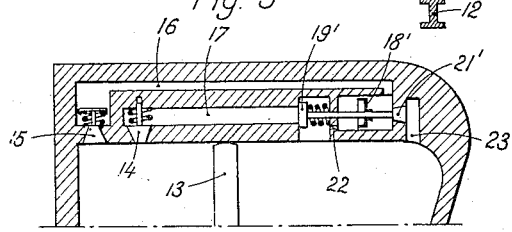
Fig. 3 is a similar fragmentary view taken through another modified form.

Figure 3 shows a modification of the arrangement described with reference to Figure 2. In this case the valve 19' and the piston 18' control a valve 21' which communicates through the conduit 23 with the right hand side of the spherical piston 13; the conduit 17 communicates with this same part through the port 22. The piston 18' being of stamped leather the small valve of the conduit 19, Figure 2, may be done away with. The valve 21' could, of course, be replaced by any other type than that indicated.

Figure 4:
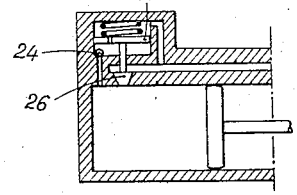
Fig. 4 is a view similar to Fig. 3, taken through a still further modification.

Figure 4 shows an auto-regulating device like that described in application Serial Nr. 598,146 filed October 31st, 1922, and in this arrangement it is the action of the pressure reigning in the left hand part of the cylinder which determines the regulation of the return port. A small valve 24 brakes the movement of the piston 25 made in one with the valve 26.

Claims:

1. A shock absorber for vehicles comprising a cylinder containing a fluid and a piston reciprocable in said cylinder and operable by movement of the axle of the vehicle, a conduit extending longitudinally of the cylinder, and a chamber at one end of the latter, apertures establishing communication between the cylinder and conduit on both sides of the piston, and valved ports controlling communication between said cylinder and said chamber, substantially as described.

2. A shock absorber for vehicles comprising a cylinder containing a fluid and a piston reciprocable in said cylinder and operable by movement of the axle of the vehicle, a conduit extending longitudinally of the cylinder, and a chamber at one end of the latter, apertures establishing communication between the cylinder and conduit on both sides of the piston, valved ports controlling communication between said cylinder and said chamber, and means for compressing air in said chamber by the reciprocation of the piston, and for utilizing said compressed air to effect the return movement of the piston, substantially as described.

3. A shock absorber for vehicles comprising a cylinder containing a fluid and a piston reciprocable therein by movement of the axle of the vehicle, a partition extending longitudinally of the cylinder and forming a conduit and a chamber at one end of the cylinder, and valve-controlled ports establishing communication between said cylinder, on one side of said piston, and between said chamber and said cylinder, on the other side of said piston, substantially as described.

4. A shock absorber for vehicles comprising a cylinder containing a fluid and a piston reciprocable therein by movement of the axle of the vehicle, in combination with valved ports communicating with the cylinder on one side of the piston, and with means whereby reciprocation of the piston compresses air on the other side thereof, substantially as described.

5. A shock absorber for vehicles comprising a cylinder containing a fluid and a piston reciprocable therein by movement of the axle of the vehicle, in combination with valved ports communicating with the cylinder on one side of the piston, and with means whereby reciprocation of the piston compresses air on the other side thereof, and means for utilizing said compressed air to effect the return reciprocation of the piston, substantially as described.

In testimony whereof I affix my signature.

GEORGES HENRI ERNEST de RAM.